(12) United States Patent
Sakata et al.

(10) Patent No.: US 9,118,382 B2
(45) Date of Patent: Aug. 25, 2015

(54) RELAY APPARATUS FOR BROADCAST WAVES

(75) Inventors: Satoshi Sakata, Kiyose (JP); Jun Abe, Kodaira (JP); Osamu Otosaka, Higashimurayama (JP); Makoto Watanabe, Kawaguchi (JP); Motoki Chibazaki, Saitama (JP); Kazuhiko Yoshii, Kawasaki (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 59 days.

(21) Appl. No.: 14/127,687

(22) PCT Filed: Jun. 28, 2012

(86) PCT No.: PCT/JP2012/066577
§ 371 (c)(1),
(2), (4) Date: Dec. 19, 2013

(87) PCT Pub. No.: WO2013/005643
PCT Pub. Date: Jan. 10, 2013

(65) Prior Publication Data
US 2014/0162548 A1 Jun. 12, 2014

(30) Foreign Application Priority Data
Jul. 1, 2011 (JP) ................. 2011-147059

(51) Int. Cl.
H04B 3/36 (2006.01)
H04B 7/155 (2006.01)
H04H 20/06 (2008.01)
H04B 7/14 (2006.01)
H04H 20/67 (2008.01)

(52) U.S. Cl.
CPC .......... *H04B 7/15528* (2013.01); *H04H 20/06* (2013.01); *H04B 7/14* (2013.01); *H04B 7/15507* (2013.01); *H04H 20/67* (2013.01)

(58) Field of Classification Search
CPC ... H04B 7/15528; H04B 7/15507; H04B 7/14
USPC .......... 455/7, 11.1, 9, 3.01–3.06, 422.1, 403, 455/426.1, 426.2, 414.1–414.4, 550.1, 13.1, 455/15, 445; 725/62–72; 370/315–316, 370/328, 329, 343, 310, 338
See application file for complete search history.

(56) References Cited

U.S. PATENT DOCUMENTS 5,479,400 A * 12/1995 Dilworth et al. .............. 370/331

FOREIGN PATENT DOCUMENTS

JP 2000-278197 A 10/2000
JP 2001-077778 A 3/2001
(Continued)

OTHER PUBLICATIONS

International Search Report for PCT/JP2012/066577, ISA/JP, mailed Jul. 24, 2012.

*Primary Examiner* — Keith Ferguson
(74) *Attorney, Agent, or Firm* — Harness, Dickey & Pierce, P.L.C.

(57) ABSTRACT

The objective of the present invention is to provide a relay apparatus capable of performing normal relay transmission for broadcast waves by preventing effects caused by wraparound in a relay apparatus. For broadcast waves received by a relay apparatus (2), the same broadcast data are placed in each of a defined segment (f0) and a first segment (f1) other than the defined segment, whereupon the relay apparatus removes broadcast data for the defined segment (f0) from the received broadcast waves, and transmits broadcast waves in which the broadcast data for the first segment (f1) have been exchanged with each of the defined segment (f0) and a second segment (f2) other than the defined segment and the first segment. As a result, the defined segment (f0) which imparts wraparound effects to the received broadcast waves is removed, and therefore, it is possible to perform normal relay transmission of the broadcast waves.

6 Claims, 12 Drawing Sheets

(56) References Cited

FOREIGN PATENT DOCUMENTS

| JP | 2006-020128 A | 1/2006 |
|----|---------------|--------|
| JP | 2006-197488 A | 7/2006 |
| JP | 2009-212577 A | 9/2009 |
| JP | 2010-062809 A | 3/2010 |
| JP | 2010-062811 A | 3/2010 |
| JP | 2010-118903 A | 5/2010 |
| JP | 2010-154416 A | 7/2010 |

* cited by examiner

RELAY APPARATUS FOR BROADCAST WAVES

CROSS-REFERENCE TO RELATED APPLICATIONS

This application is a 371 U.S. National Stage of International Application No. PCT/JP2012/066577, filed Jun. 28, 2012, which claims priority to Japanese Patent Application No. 2011-147059, filed Jul. 1, 2011. The disclosures of the above applications are incorporated herein by reference.

TECHNICAL FIELD

The present invention relates to a relay apparatus for relaying broadcast waves in which broadcast data are placed in a defined segment (frequency) and to a technology suitably used for an area broadcasting system covering a comparatively small specific area (for example, an event site) using a one-segment broadcasting system.

BACKGROUND ART

One-segment broadcasting is one type of digital terrestrial broadcasting ISDB-T (Integrated Services Digital Broadcasting-Terrestrial), and it is one type of partial segment broadcasting that performs transmission of broadcast waves in which broadcast data are placed in a specific frequency (segment) within a transmission channel and is being used for broadcasting to mobile terminals and the like. A method of broadcasting in a partial segment of the number of all segments in a transmission channel for SDTV (Standard Definition Tele-Vision) broadcasting such as the one-segment broadcasting, so-called digital radio broadcasting (terrestrial digital audio broadcasting) of 3 segs (three segments), educational television broadcasting of 4 segments and the like is called as partial segment broadcasting below.

And, partial segment broadcasting such as one-segment broadcasting is suitable for implementation by SFN (Single Frequency Network) system and implementation by a broadcasting system (area broadcasting) covering a relatively small area with a very low transmission power, and its further expansion of use in the future is expected.

For example, if a large area is tried to be constructed under the SFN environment to construct an area to be covered by digital terrestrial broadcasting, it is necessary to construct the SFN environment by performing multistage relay of broadcast waves.

As shown in FIG. 11, the digital terrestrial broadcasting performs transmission of broadcast waves emitted from a transmission station (master station) by relaying at several relay transmission stations, and it is easy to perform multistage relay of a stable radio wave between transmission stations.

However, for digital terrestrial broadcasting, if the transmission station (master station, higher rank station) or the relay transmission station (relay station) is located in an urban region or a mountain region, as shown in FIG. 12, radio reflections are many due to vehicular traffic in the urban region, buildings or mountains, and it is difficult to construct the SFN environment by multistage relay of broadcast waves. For example, it is difficult for a wraparound canceller to be used in the transmission station of digital terrestrial broadcasting to cancel the wraparound wave stably and continuously to transmit a broadcast wave signal (retransmitted wave) to a subsequent stage because a change in received signal level of broadcast waves due to the influence of radio reflection and a change in a number of multipath waves and a D/U ratio are considerable.

Here, the concept of segment of digital terrestrial broadcasting is described.

As shown in FIG. 13, within a channel (13 segments resulting from 14 divisions of each 6 MHz in the example shown in the drawing) of digital terrestrial broadcasting, one-segment broadcast waves, a method wave in which broadcast data has been placed in one segment (segment number 0) is emitted to provide a broadcasting service. Receivers of one-segment broadcasting receive a broadcast wave of segment number 0 and receive images, sounds and data.

Even when such one-segment broadcasting service of digital terrestrial broadcasting is performed, it is difficult to perform stably a multistage relay in an SFN environment in an urban region or a mountain region similar to the above.

Patent Literature 1 proposes, in order to solve a problem that a broadcasting system (area broadcasting) covering a specific area with a very low transmission power using the one-segment broadcasting system tends to have a dead zone in its service area, a broadcasting method that can be remedy or reduce the dead zone of area broadcasting by so-called frequency diversity by transmitting simultaneously a signal having the same contents in another possible transmission frequency band part of a usable transmission frequency band.

Patent Literature 2 proposes a transmission system in which when plural transmission apparatuses perform radio transmission of a signal using a different segment of the same channel by an OFDM modulation method, one or more transmission apparatuses among the plural transmission apparatuses, in order to improve reception characteristics of the receiving apparatus, receive a predetermined signal from the outside by a receiving means, and controls transmission timing of the OFDM modulated signal by a transmission timing control means at the timing according to the signal received by the receiving means.

Patent Literature 3 proposes a transmission apparatus in order to provide a transmission apparatus capable of determining a segment (frequency) to be output according to an input signal for area broadcasting of for example a digital terrestrial broadcasting system, wherein a channel detection means detects a channel according to information for identifying the channel contained in an input signal for broadcasting, a segment detection means detects a segment according to information for identifying the segment contained in the input signal for broadcasting, and a modulated signal generation means generates a modulated signal in which placed is data for broadcasting contained in the input signal for broadcasting at the position of the segment detected by the segment detection means among plural segments provided in the channel detected by the channel detection means, and outputs the modulated signal generated by the modulated signal detection means.

Patent Literature 4 proposes a transmission apparatus in order to provide a transmission apparatus capable of determining a segment (frequency) to be output according to usage conditions of radio waves of a different frequency in the air for area broadcasting of for example a digital terrestrial broadcasting system, wherein a segment detection means detects a segment corresponding to an unused frequency region to be used for transmission on the basis of a relation of a frequency region to a signal level of the radio wave received by radio, and a transmission signal generation means generates a transmission signal having thereon data for broadcasting included in a signal for broadcasting inputted to the position of a segment detected by the segment detection means, and outputs the transmission signal generated by the transmission signal generation means.

Patent Literature 5 proposes a broadcasting system which is provided with a first transmitter for transmitting a digital terrestrial broadcasting wave of a central segment common to a predetermined region, and other transmitters for transmitting a radio wave for transmitting a digital terrestrial broadcasting wave of a periphery segment to a portion of the predetermined region to make the area broadcasting receivable in the large range, the broadcasting system having a means for controlling at least one of a transmission point arrangement of a central segment and a periphery segment adjacent to the central segment, a transmission electric field, a retransmission electric field, a frequency channel interval, a transmission antenna height, transmission antenna directivity, transmission phase synchronization, a frequency segment interval and a transmission electric field propagating property, and for separating a transmission electric field of the digital terrestrial broadcasting wave of the periphery segment from a receiving electric field of the central segment near the ground in the predetermined region.

CITATION LIST

Patent Literature

PATENT LITERATURE 1: JP-A-2010-118903
PATENT LITERATURE 2: JP-A-2010-154416
PATENT LITERATURE 3: JP-A-2010-62811
PATENT LITERATURE 4: JP-A-2010-62809
PATENT LITERATURE 5: JP-A-2009-212577

SUMMARY OF INVENTION

Technical Problem

As described above, in the relay transmission for partial segment broadcasting of a one-segment broadcasting system or the like, it is difficult to cancel stably and continuously wraparound waves due to effects of radio reflection or the like, resulting in a problem that there occurs an adverse effect on the transmission of a broadcast wave signal to a subsequent stage.

Specifically, for example, the one-segment broadcasting system had a problem that a relay transmission station (relay apparatus) receives broadcast waves in which broadcast data are placed in a segment of segment number 0 and performs relay transmission of the broadcast waves again, but if the broadcast waves which were undergone the relay transmission were received by the same relay transmission station due to wraparound, broadcast data having a time lag interfere with each other and it becomes difficult to transmit the broadcast waves normally.

The present invention has been made in view of the above existing circumstances and aims to provide a relay apparatus that can perform normal relay transmission of broadcast waves by preventing effects caused due to wraparound.

Solution to Problem

The present invention is a relay apparatus for relaying broadcast waves in which broadcast data are placed in a defined segment among a plurality of segments, wherein the broadcast waves received by the relay apparatus have the same broadcast data placed in each of the defined segment and a first segment other than the defined segment, and the relay apparatus removes broadcast data for the defined segment from the received broadcast waves and transmits broadcast waves in which the broadcast data for the first segment of the received broadcast waves have been exchanged with each of the defined segment and a second segment other than the defined segment and the first segment.

The present invention has been made based on a novel technical idea that in order to prevent the wraparound, an excess or usable frequency (segment) of the broadcast waves is effectively used (more specifically, broadcast data is exchanged with another segment), and explaining with reference to the example shown in FIG. 13, the broadcast waves having the same broadcast data placed in each of a defined segment (e.g., segment number 0) and a first segment (e.g., any segment other than the segment number 0 of 13 segments among 14 divided segments) other than the defined segment are subject to relay transmission. Therefore, according to the present invention, the transmission station (transmission apparatus) transmits the broadcast waves having the same broadcast data placed in each of the defined segment and the first segment.

And, the relay apparatus according to the present invention removes broadcast data for the defined segment from the received broadcast waves and transmits the broadcast waves in which broadcast data for the first segment of the received broadcast waves have been exchanged with each of the defined segment and a second segment other than the defined segment and the first segment. As a result, for the transmission broadcast waves and the received broadcast waves, the same broadcast data are subject to relay transmission in the form placed in a different segment other than the defined segment, and effects caused due to wraparound can be prevented.

Incidentally, the first segment of the received waves and the second segment of the transmitted waves are different segments in the same relay apparatus, but when the multistage relay is performed, the subsequent-stage relay apparatus may have the first segment of the received waves in the preceding-stage relay apparatus as a second segment of the transmitted waves or have a third segment different from the above segments as the second segment of the transmitted waves.

And, the present invention can be realized as a transmission system which transmits broadcast waves, in which broadcast data are placed in the defined segment among plural segments, via a relay apparatus, and according to the transmission system, a transmission side apparatus transmits broadcast waves, in which the broadcast data are placed in the defined segment and the first segment other than the defined segment among the plural segments, to the relay apparatus, and the relay apparatus removes the broadcast data for the defined segment in the received broadcast waves and transmits broadcast waves in which the broadcast data for the first segment have been exchanged with each of the defined segment and the second segment other than the defined segment and the first segment.

And, according to the present invention, in a relay apparatus that relays broadcast waves in which broadcast data are placed in 3 or 4 segments among 13 segments within a transmission channel of broadcasting, the broadcast waves received by the relay apparatus have the same broadcast data placed in each of the defined 3 or 4 segments and the first 3 or 4 segments other than the 3 or 4 segments, and the relay apparatus removes broadcast data for the defined 3 or 4 segments from the received broadcast waves and transmits the broadcast waves in which the broadcast data for the first 3 or 4 segments of the received broadcast waves have been exchanged with each of the defined 3 or 4 segments and the second 3 or 4 segments other than the first 3 or 4 segments.

Advantageous Effects of Invention

According to the present invention, relay transmission of broadcast waves that have prevented effects caused due to wraparound can be realized by effectively using a frequency (segment).

And, according to the present invention, area broadcasting by multistage relay can be realized in high quality, and a radio wave can be used effectively.

More specifically, by performing transmission of broadcast waves to a subsequent stage while shifting a frequency (segment) within one transmission channel, a relay transmission system, that can perform multistage relay and can construct SFN without receiving effects due to wraparound, can be realized.

DESCRIPTION OF EMBODIMENTS

Figure 1:
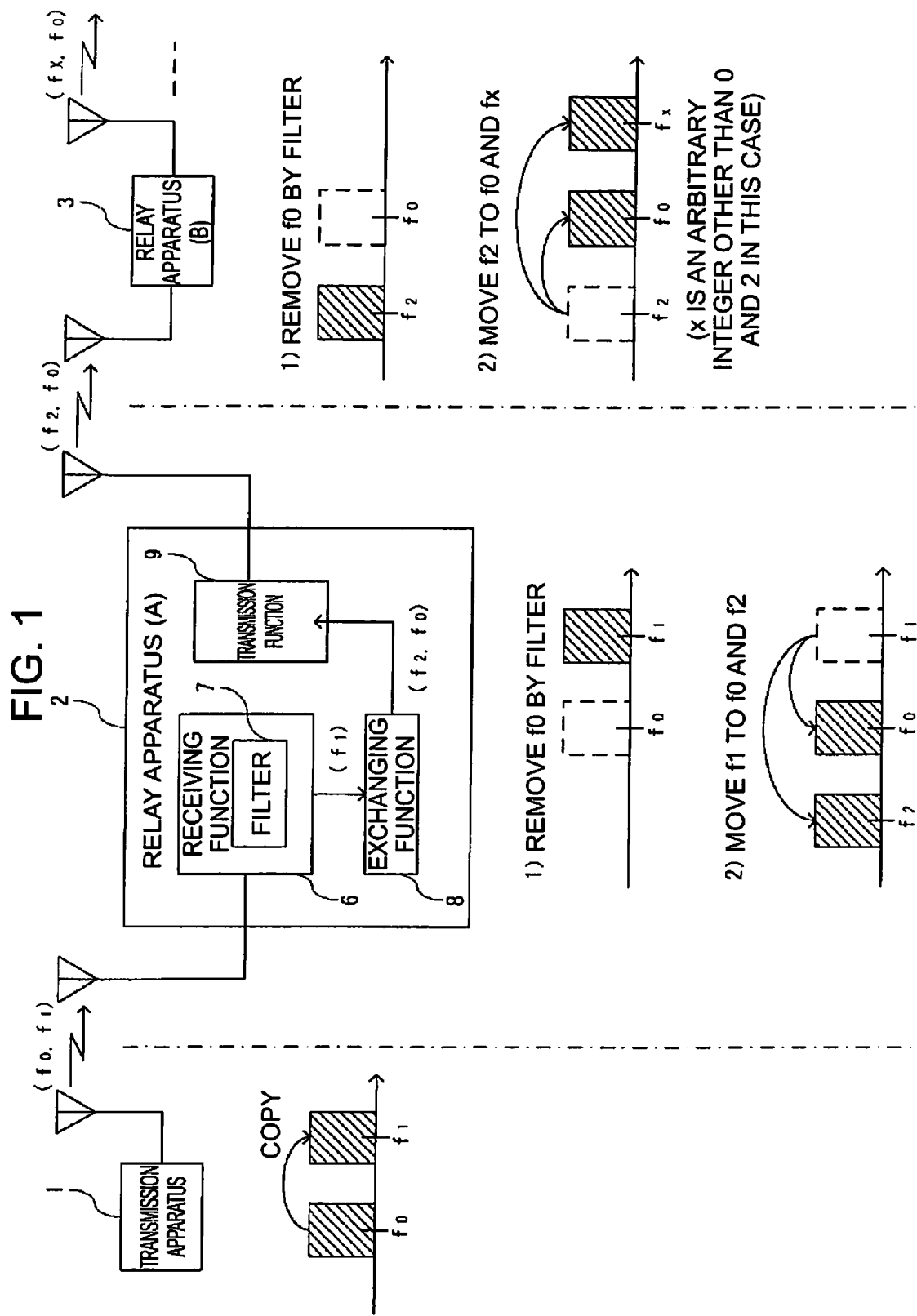
[FIG. 1] A diagram illustrating a relay apparatus according to one embodiment of the present invention.

The present invention is described specifically according to the embodiments shown in the drawings.

Figure 2:
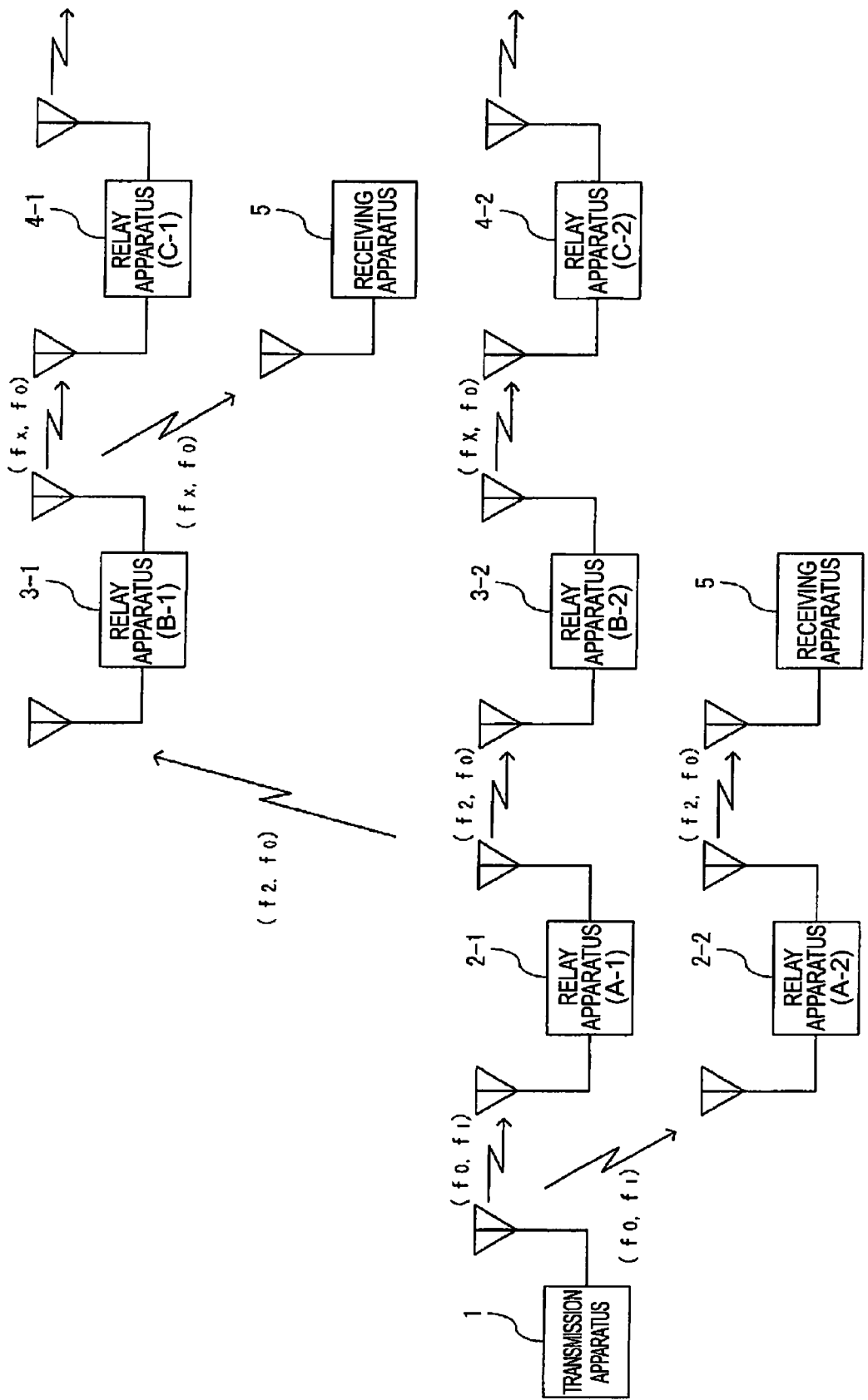
[FIG. 2] A diagram illustrating a relay transmission according to one embodiment of the present invention.

FIG. 1 and FIG. 2 show a relay transmission system for broadcast waves according to one embodiment of the present invention.

FIG. 1 shows a basic structure of a relay transmission system that performs multistage relay, and the relay transmission system performs transmission of the broadcast waves transmitted from a transmission apparatus 1 by sequentially relaying via a relay apparatus (A)2, a relay apparatus (B)3, . . . .

This relay transmission system performs transmission of terrestrial digital broadcast waves of a one-segment method that performs transmission of broadcast waves in which broadcast data are placed in a specific segment (defined segment: f0) within a transmission channel, and also uses other segments (f1, f2, . . . fx) to perform transmission of this broadcast data.

Therefore, the transmission apparatus 1 has a function to copy and place the broadcast data which is placed in the defined segment f0 within plural segments in the first segment f1 other than the defined segment f0, and a function to perform transmission of broadcast waves (f0, f1) in which the same broadcast data are placed in the defined segment f0 and the first segment f1 to the relay apparatus (A)2.

And, the relay apparatus (A)2 which relays the broadcast waves (f0, f1) from the transmission apparatus 1 has a reception function 6 of receiving the broadcast waves (f0, f1), a filter function 7 of removing broadcast data for the defined segment f0 from the received broadcast waves (f0, f1), an exchanging function 8 of exchanging broadcast data for the first segment f1 of the received broadcast waves (f0, f1) with each of the defined segment f0 and a second segment f2 other than the defined segment and the first segment, a transmission function 9 of transmitting the broadcast waves (f0, f2) in which the same broadcast data are placed in the defined segment f0 and the second segment f2 to the relay apparatus (B)3.

Therefore, the relay apparatus (A)2 removes the broadcast data for the defined segment f0 from the received broadcast waves (f0, f1) and transmits the transmission broadcast waves (f0, f2) in which the broadcast data for the first segment f1 have been exchanged with each of the defined segment f0 and the second segment f2 to the relay apparatus (B)3.

As a result, even if wraparound occurs in the transmission broadcast waves (f0, f2), the defined segment f0 of the received broadcast waves (f0, f1) is not undergone the relay transmission but broadcast data for the first segment f1 is, so that the relay apparatus (A)2 can normally perform the relay transmission of the broadcast data.

And, the relay apparatus (B)3 at the subsequent stage also has the same function as the relay apparatus (A)2 does, removes broadcast data for the defined segment f0 from the received broadcast waves (f0, f2), and transmits the broadcast waves (f0, fx) in which broadcast data for the second segment f2 of the received broadcast waves (f0, f2) have been exchanged with each of the defined segment f0 and the third segment fx other than the defined segment and the second segment to the subsequent stage.

In this case, the third segment fx may be a segment different from the defined segment f0 and the second segment f2, and even if the first segment f1 is used as the third segment fx, wraparound in the relay apparatus (B)3 can be prevented. That is, "x" is an arbitrary integer other than "0" and "2" among the segment numbers usable for transmission of the broadcast data.

For example, when the broadcast wave is an OFDM signal with a guard interval, a strong signal can be selectively received, and the arbitrary property of the segment (frequency) becomes high.

By the relay transmission system as described above, for example, area broadcasting by multistage relay can be realized as shown in FIG. 2.

That is to say, relay apparatuses 2-1, 2-2, which have received broadcast waves (f0, f1) transmitted from the transmission apparatus (transmission station) 1, perform relay transmission of broadcast waves (f0, f2), further, relay apparatuses 3-1, 3-2, which have received the broadcast waves (f0, f2) perform relay transmission of broadcast waves (f0, fx), further a subsequent-stage relay apparatus performs relay transmission of broadcast waves while shifting a segment in which broadcast data is placed, and a receiving apparatus 5 such as a TV receiver receives the transmitted broadcast waves and outputs images according to broadcast data.

Then, multistage relay of the broadcast data (contents) is described in further detail with reference to FIG. 3 to FIG. 5.

For example, when it is desired to perform one-segment service, the contents are sent out with the defined segment f0 of segment number of an arbitrary channel. At that time, for a multistage relay, a signal (contents) same as the segment number f0 is copied and emitted to segment f11 of for example segment number 11 other than the segment f0.

In this explanation, a region covering one-segment service from the initial radio emission point is called a parent cell, and each of regions which receives the radio wave of the parent cell and performs a multistage relay is called a child cell. Cells are determined to be present in number adequate for performing the multistage relay.

Figure 3:
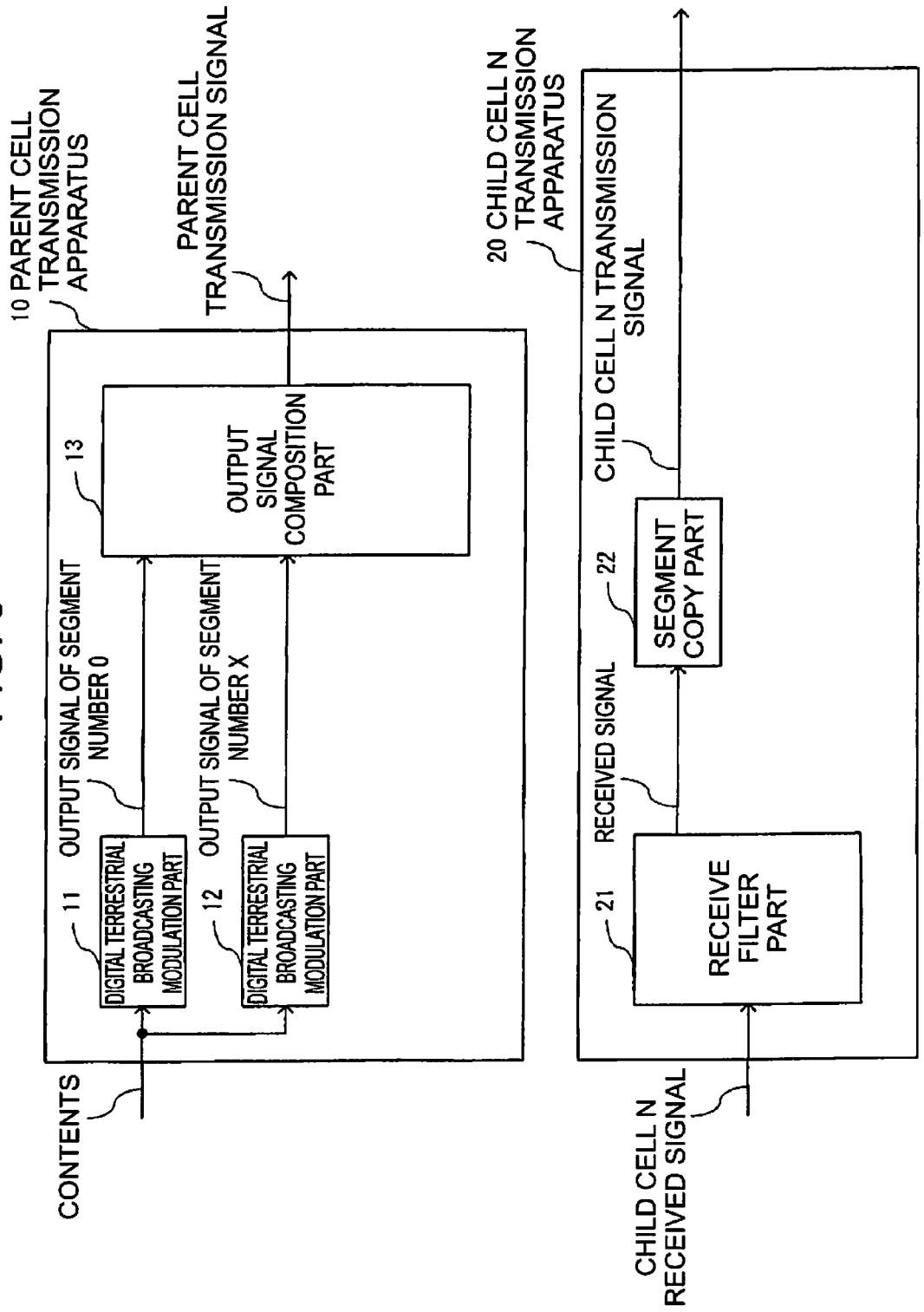
[FIG. 3] A diagram illustrating a relay apparatus according to one embodiment of the present invention.

FIG. 3 shows structures of a transmission apparatus 10 forming a parent cell and a transmission apparatus 20 forming a child cell.

Incidentally, the parent cell transmission apparatus 10 corresponds to the transmission apparatus 1 shown in FIG. 1, and the child cell transmission apparatus 20 corresponds to the relay apparatus 2 shown in FIG. 1.

And, if necessary, numbers are assigned to describe as child cell 1, child cell 2, . . . etc. to distinguish the child cells for performing a multistage relay from one another, and a child cell N is described to call collectively such child cells.

The parent cell transmission apparatus 10 has a digital terrestrial broadcasting modulation part 11, a digital terrestrial broadcasting modulation part 12, and an output composition part 13.

Contents for performing the service are input to the parent cell transmission apparatus 10, and the contents are input to the digital terrestrial broadcasting modulation part 11 and the digital terrestrial broadcasting modulation part 12.

The digital terrestrial broadcasting modulation part 11 sends out the output signal as a signal of segment number 0 to the output signal composition part 13, and the digital terrestrial broadcasting modulation part 12 sends out a segment number X output signal as a signal other than segment number 0 to the output signal composition part 13. The output signal composition part 13 outputs broadcast waves including the segment number 0 output signal and the segment number X output signal as parent cell transmission signal.

Figure 4:
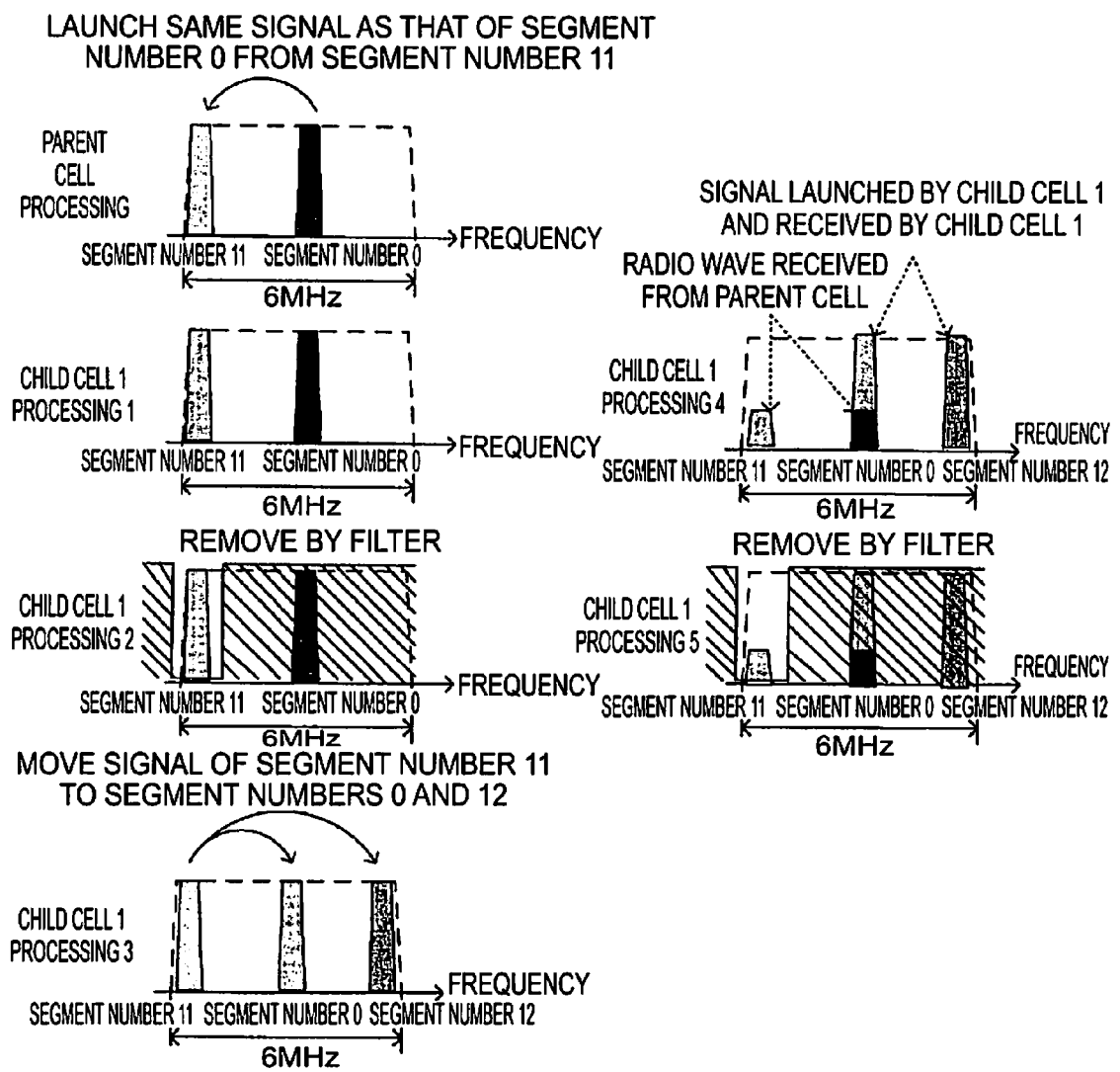
[FIG. 4] A diagram illustrating exchange processing of broadcast data according to one embodiment of the present invention.

Incidentally, the above processing is parent cell processing of FIG. 4.

A child cell N transmission apparatus 20 has a receive filter part 21 and a segment copy part 22.

The child cell N transmission apparatus 20 receives as a child cell N received signal with reception characteristics changed from a higher-level transmission apparatus through a propagation path. For example, a child cell 1 transmission apparatus receives as a child cell 1 received signal the parent cell transmission signal emitted by the parent cell transmission apparatus 10 which is a transmission apparatus of its higher level. The figure of N shows that the child cell transmission apparatus is at what stage and may be in any order.

Figure 5:
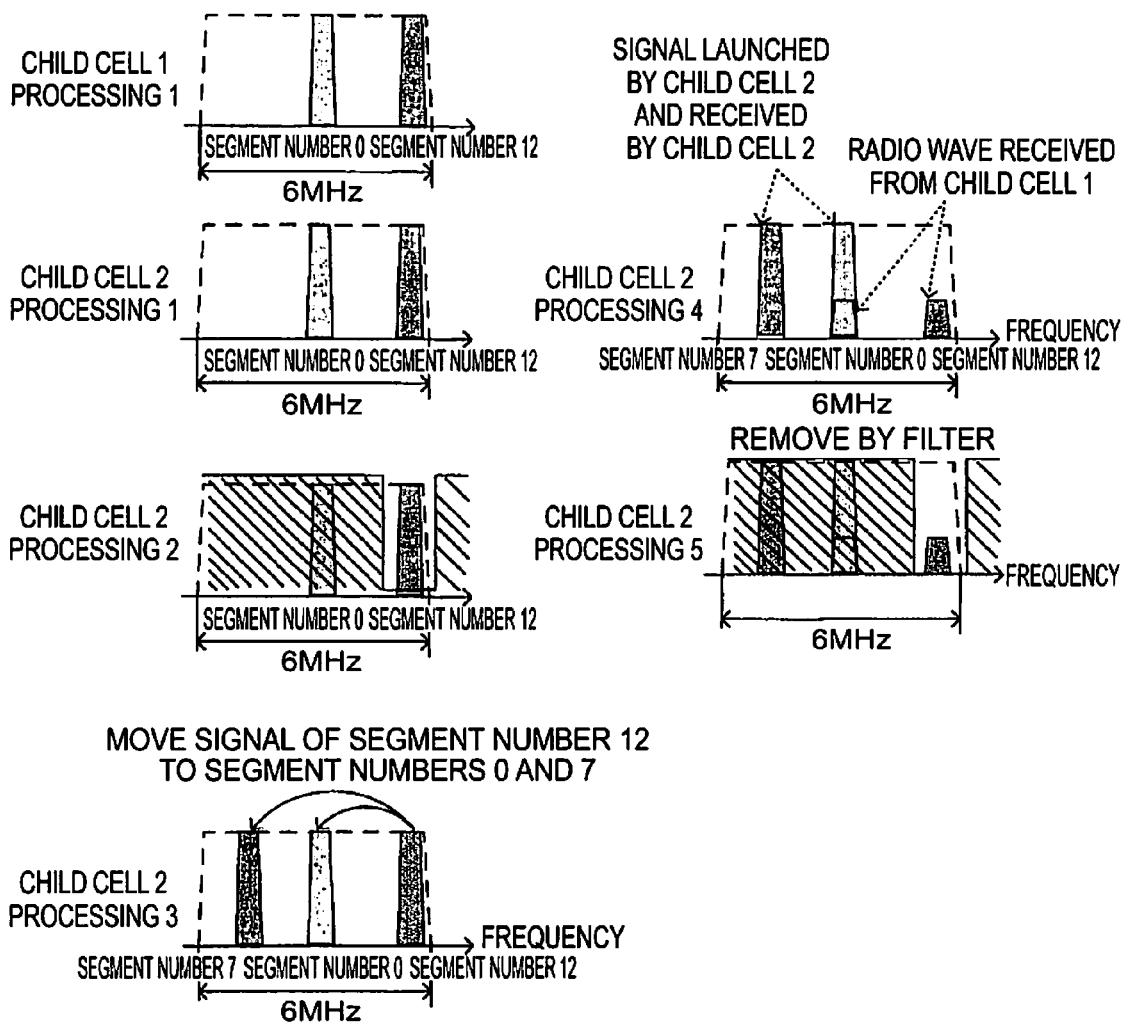
[FIG. 5] A diagram illustrating exchange processing of broadcast data according to one embodiment of the present invention.

And, processing of the child cell N received signal is shown in each of FIG. 4 and FIG. 5.

The child cell N receiving apparatus 20 inputs the child cell N received signal to the receive filter part 21, and outputs the received signal from the receive filter part 21 to the segment copy part 22. Processing by the receive filter part 21 is child cell 1 processing 2 of FIG. 4.

The segment copy part 22 copies the contents of the received signal and outputs as a child cell N transmission signal. Processing of the segment copy part 22 is child cell 1 processing 3 of FIG. 4.

The child cell 1 transmission signal emitted by the child cell 1 is input due to wraparound as a child cell received signal which is a received signal of the child cell 1 itself. The state of interference between the received waves and the transmitted waves at this time is child cell 1 processing 4 of FIG. 4.

But, a one-segment signal can be extracted finely at the subsequent-stage receive filter part 21 by processing by child cell 1 processing 5 of FIG. 4, and oscillation due to wraparound is not generated.

Thus, the child cell 1 transmission signal emitted by the child cell 1 transmission apparatus is received as a child cell 2 received signal by the child cell 2 transmission apparatus and output as a child cell 2 output signal.

And, the figure of N may increase infinitely, and the child cell is increased as 1, 2, 3 . . . N, and a one-segment radio wave is transmitted to subsequent stages.

The above processing is described in further detail with reference to FIG. 4 and FIG. 5.

For example, the child cell 1 receives the radio wave emitted from the parent cell. That state is shown by child cell 1 processing 1 of FIG. 4.

Subsequently, the signal received with a segment number other than the segment number 11 is removed. That state is shown by the child cell 1 processing 2 of FIG. 4.

Subsequently, the signal received with segment number 11 other than the segment number 0 is shifted to the segment number 0, and to allow a multistage relay by a subsequent-stage cell of the child cell 1, it is also copied and transmitted to for example the segment number 12 other than the segment number 0. That state is shown by the child cell 1 processing 3 of FIG. 4.

The radio waves emitted by the child cell 1 are segment numbers 0 and 1, and the radio waves received from the parent cell are segment numbers 0 and 1, so that the radio wave of the segment number 0 emitted by the child cell 1 is mixed due to wraparound into a receiving part of the child cell 1. That state is shown by the child cell 1 processing 4 of FIG. 4. But, since the child cell 1 removes a signal having segment number 0, effects caused due to wraparound do not occur. That state is shown by the child cell 1 processing 5 of FIG. 4.

Since the signal of segment number 0 emitted by the parent cell and the signal of segment number 0 emitted by the child cell 1 are the same signal, an SFN environment can be constructed between the parent cell and the child cell 1, and reception is not affected even if the parent cell and the child cell 1 have an overlapped region.

That is, a receiver of one-segment service can receive continuously the segment number 0 from the parent cell to the child cell 1. That state is shown in FIG. 4.

Subsequently, the child cell 2 receives signals of segment numbers 0 and 12 from the child cell 1. That state is shown by child cell 2 processing 1 f FIG. 5.

Subsequently, signals other than the segment number 12 are removed. That state is shown by child cell 2 processing 2 of FIG. 5.

And, the signal of segment number 12 is shifted to segment number 0 and also shifted to segment number 7, and broadcast waves (radio waves) which have placed the contents in segment numbers 0 and 7 are emitted. That state is shown by child cell 2 processing 3 of FIG. 5.

Similar to the child cell 1, the child cell 2, when it has segment number 0, has the radio wave received from the child cell 1 and the radio wave emitted by the child cell 2 mixed into the receiving part of the child cell 2 due to wraparound. That state is shown by child cell 2 processing 4 of FIG. 5.

But, the child cell 2 removes signals other than the segment number 12, so that effects caused due to wraparound do not occur. That state is shown by child cell 2 processing 5 of FIG. 5.

Since the signal with segment number 0 emitted by the child cell 1 and the signal with segment number 0 emitted by the child cell 2 are the same signal, an SFN environment can be constructed between the child cell 1 and the child cell 2, and reception is not affected even if the child cell 1 and the child cell 2 have an overlapped region. A flow of the processing is shown in FIG. 5.

Therefore, it is possible to receive continuously the segment number 0 from the child cell 1 to the child cell 2. Going back in time, it becomes possible to receive continuously the segment number 0 from the parent cell to the child cell 1 and the child cell 2. Thus, when transmission is performed while changing the adjacent cell and the segment being sent out by the child cell, it becomes possible to increase the cell number N arbitrarily. If it is possible to increase the cell number N arbitrarily, a receiver of one-segment service can receive one segment continuously from the parent cell to the child cell N.

Next, an embodiment in which a control signal of each cell transmission apparatus is also transmitted in addition to the contents to be serviced is described.

Figure 6:
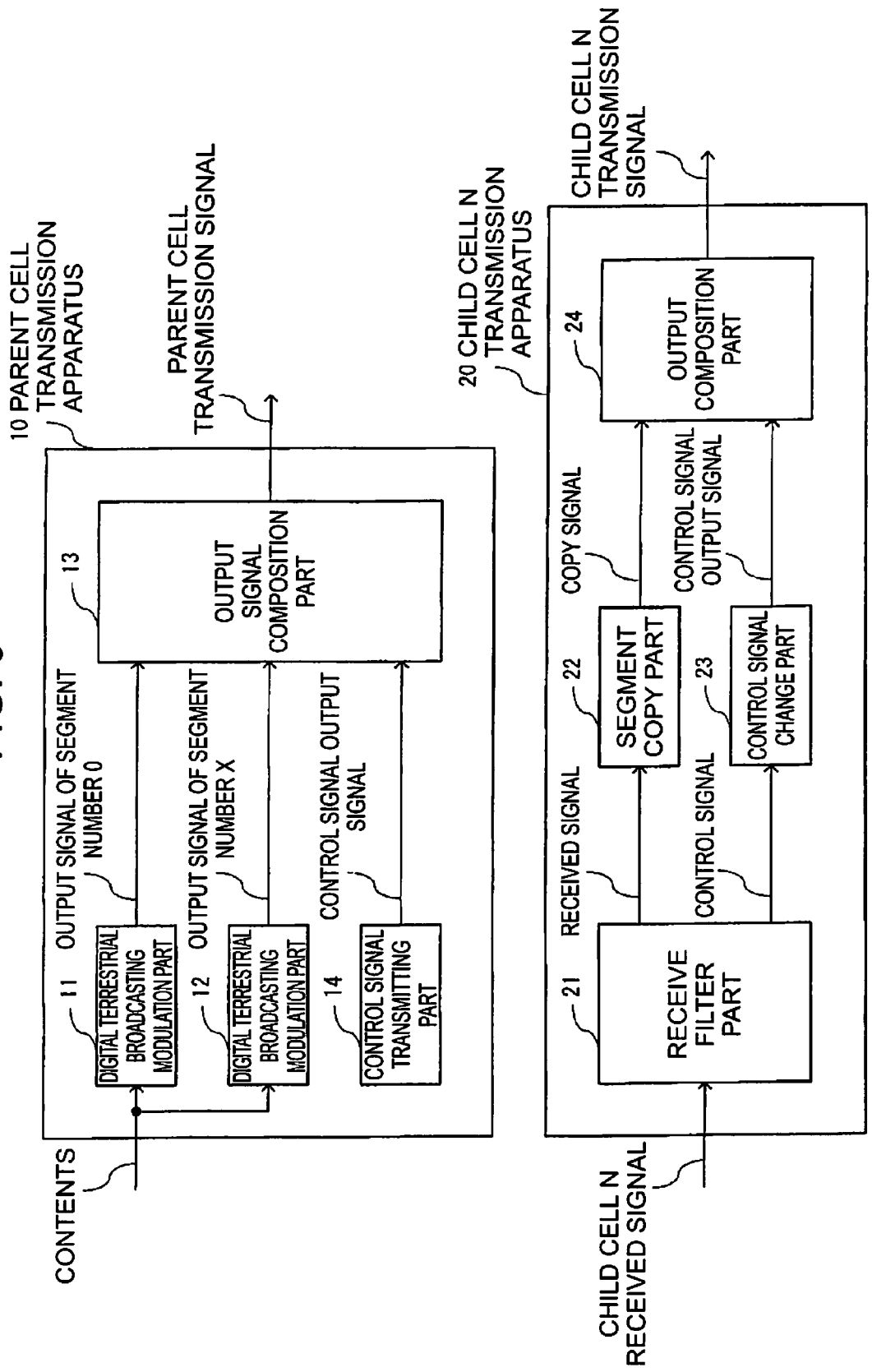
[FIG. 6] A diagram illustrating a relay apparatus according to one embodiment of the present invention.

FIG. 6 shows a structure of a transmission apparatus 10 forming a parent cell and a transmission apparatus 20 forming a child cell.

The parent cell transmission apparatus 10 has a control signal transmitting part 14 in addition to a digital terrestrial broadcasting modulation part 11, a digital terrestrial broadcasting modulation part 12, and an output composition part 13.

The contents to be serviced are input to the parent cell transmission apparatus 10, and the contents are input to the digital terrestrial broadcasting modulation part 11 and the digital terrestrial broadcasting modulation part 12.

The digital terrestrial broadcasting modulation part 11 sends out as a signal of segment number 0 the segment number 0 output signal to the output signal composition part 13, and the digital terrestrial broadcasting modulation part 12 sends out as a signal other than the segment number 0 the segment number X output signal to the output signal composition part 13.

The control signal transmitting part 14 outputs as a control signal of each cell transmission apparatus a control signal output signal to the output signal composition part 13.

The output signal composition part 13 inputs the segment number 0 output signal, the segment number X output signal and the control signal output signal and outputs a parent cell transmission signal. The parent cell transmission signal is parent cell processing of FIG. 7.

The child cell N transmission apparatus 20 has a control signal change part 23 and an output signal composition part 24 in addition to the receive filter part 21 and the segment copy part 22.

The child cell N transmission apparatus 20 receives as a child cell N received signal with reception characteristics changed from a higher-level transmission apparatus through a propagation path. For example, the child cell 1 transmission apparatus receives as a child cell 1 received signal a parent cell transmission signal emitted from its higher-level transmission apparatus which is the parent cell transmission apparatus 10. The child cell N received signal is child cell 1 processing 1 of FIG. 7.

The child cell N receiving apparatus 20 inputs the child cell N received signal to the receive filter part 21 and outputs the received signal to the segment copy part 22. The processing by the receive filter part 21 is child cell 1 processing 2 of FIG. 7.

The segment copy part 22 copies the segment and output as a child cell N transmission signal to the output composition part 24.

The control signal change part 23 may rewrite or not rewrite the content of the control signal, shifts the frequency to a segment different from the received segment, and outputs as a control signal output signal to the output composition part 24.

The output composition part 24 combines the copy signal and the control signal output signal and outputs as a child cell N transmission signal. The processing by the output composition part 24 is child cell 1 processing 3 in FIG. 7.

The child cell 1 transmission signal emitted by the child cell 1 is input due to wraparound to the child cell 1 as a child cell received signal, which is a received signal by the child cell 1 itself. The state of interference between the received waves and the transmitted waves at this time is child cell 1 processing 4 of FIG. 7.

But, a one-segment signal can be extracted finely at the subsequent-stage receive filter part 21 by the same processing as the child cell 1 processing 5 of FIG. 4, and oscillation due to wraparound is not generated.

Thus, the child cell 1 transmission signal emitted by the child cell 1 transmission apparatus is received as a child cell 2 received signal by the child cell 2 transmission apparatus and output as a child cell 2 output signal.

Figure 7:
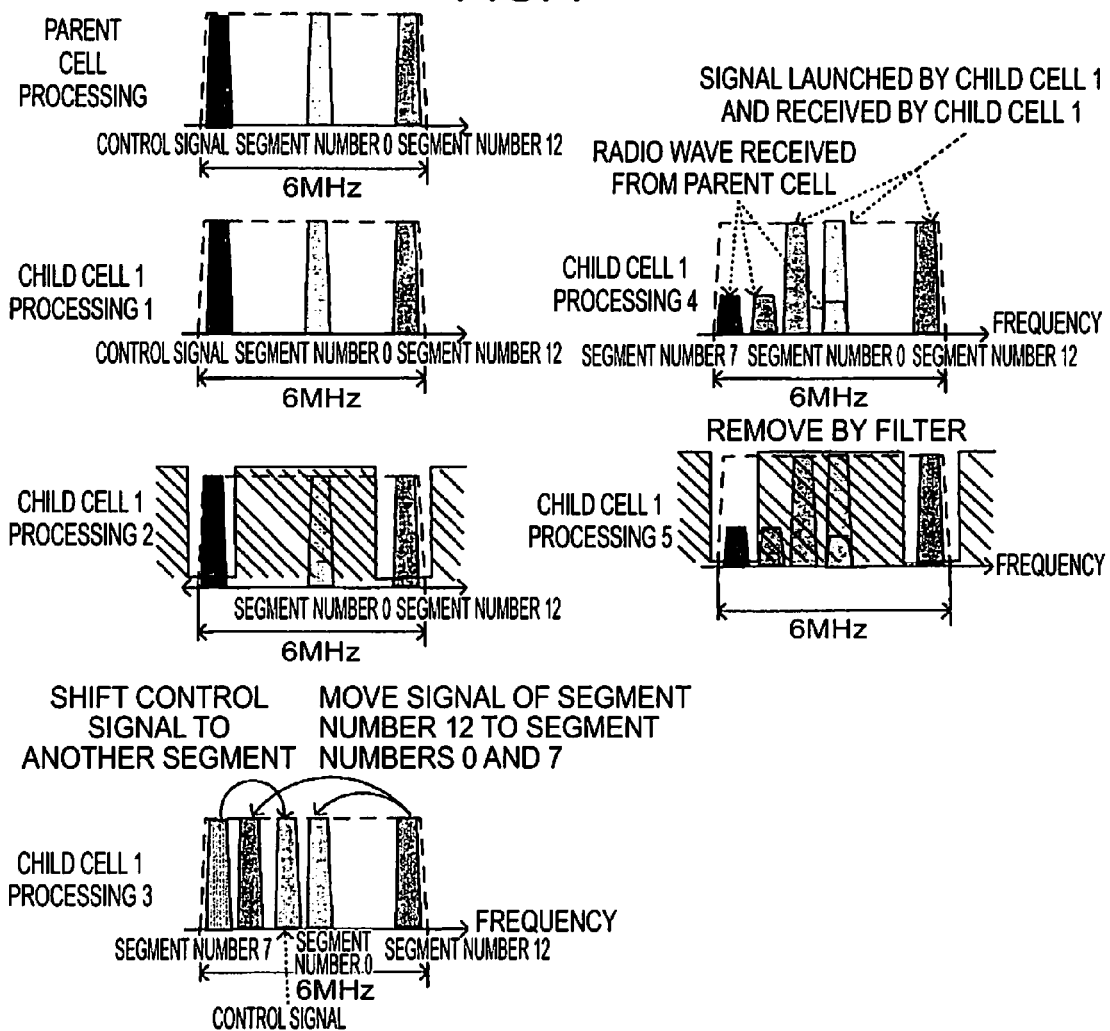
[FIG. 7] A diagram illustrating exchange processing of broadcast data according to one embodiment of the present invention.

The above processing is described in further detail with reference to FIG. 7.

For example, when it is desired to perform one-segment service, contents are sent out with segment number 0 of an arbitrary channel. At that time, for a multistage relay, the same signal (contents) as the segment number 0 is copied and emitted to for example segment number 12 other than the segment number 0. In addition to that, to construct a cell efficiently, a control signal which is a signal for control of the segment emitted by each cell transmission apparatus and for transmission of firmware of the transmission apparatus is further transmitted with another segment number (segment number 11). That state is shown by the parent cell processing of FIG. 7.

The child cell 1 receives the radio wave emitted from the parent cell. That state is shown by the child cell 1 processing 1 of FIG. 7.

Subsequently, the signals received other than the segment number 12 and the segment 11 f the control signal of the content to be transmitted to the subsequent stage are removed. That state is shown by the child cell 1 processing 2 of FIG. 7.

Subsequently, the signal received with the segment number 12 other than segment number 0 is shifted to the segment number 0, and copied and emitted to for example segment number 7 other than the segment number 0 to enable to perform a multistage relay from the child cell 1 to a subsequent-stage cell. Further, a signal to be transmitted for control is transmitted with the segment shifted by one. That state is shown by child cell 1 processing 3 of FIG. 7.

The radio waves emitted by the child cell 1 are segment numbers 0, 1, 7, and the radio waves received from the parent cell are segment numbers 0, 11, 12, so that the radio wave of the segment number 0 emitted by the child cell 1 is mixed due to wraparound into a receiving part of the child cell 1. That state is shown by child cell 1 processing 4 of FIG. 7.

But, the child cell 1 removes a signal of the segment number 0, so that effects caused due to wraparound do not occur. That state is shown by child cell 1 processing 5 of FIG. 7.

Since the signal of the segment number 0 emitted by the parent cell and the signal of the segment number 0 emitted by the child cell 1 are the same signal, an SFN environment can be constructed between the parent cell and the child cell 1, and reception is not affected even if the parent cell and the child cell 1 have an overlapped region. That is to say, a receiver of one-segment service can receive continuously the segment number 0 from the parent cell to the child cell 1.

Figure 8:
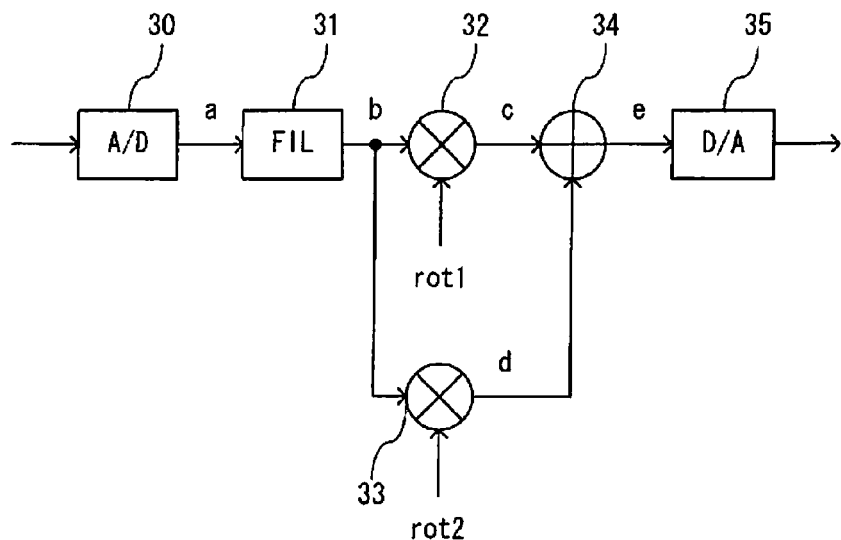
[FIG. 8] A diagram illustrating a structure for performing exchange processing of broadcast data according to one embodiment of the present invention.

Here, another structure example for performing one-segment removal and copy processing is described with reference to FIG. 8 to FIG. 10.

When the one segment removal and copy processing is performed by converting to a frequency region, FFT processing is required, a delay exceeding a guard interval generates, and it is considered that SFN becomes impractical. FIG. 8 shows a structure example performing the one segment removal and copy processing with a time axis signal, and FIG. 9 shows the content of the processing.

Figure 9:
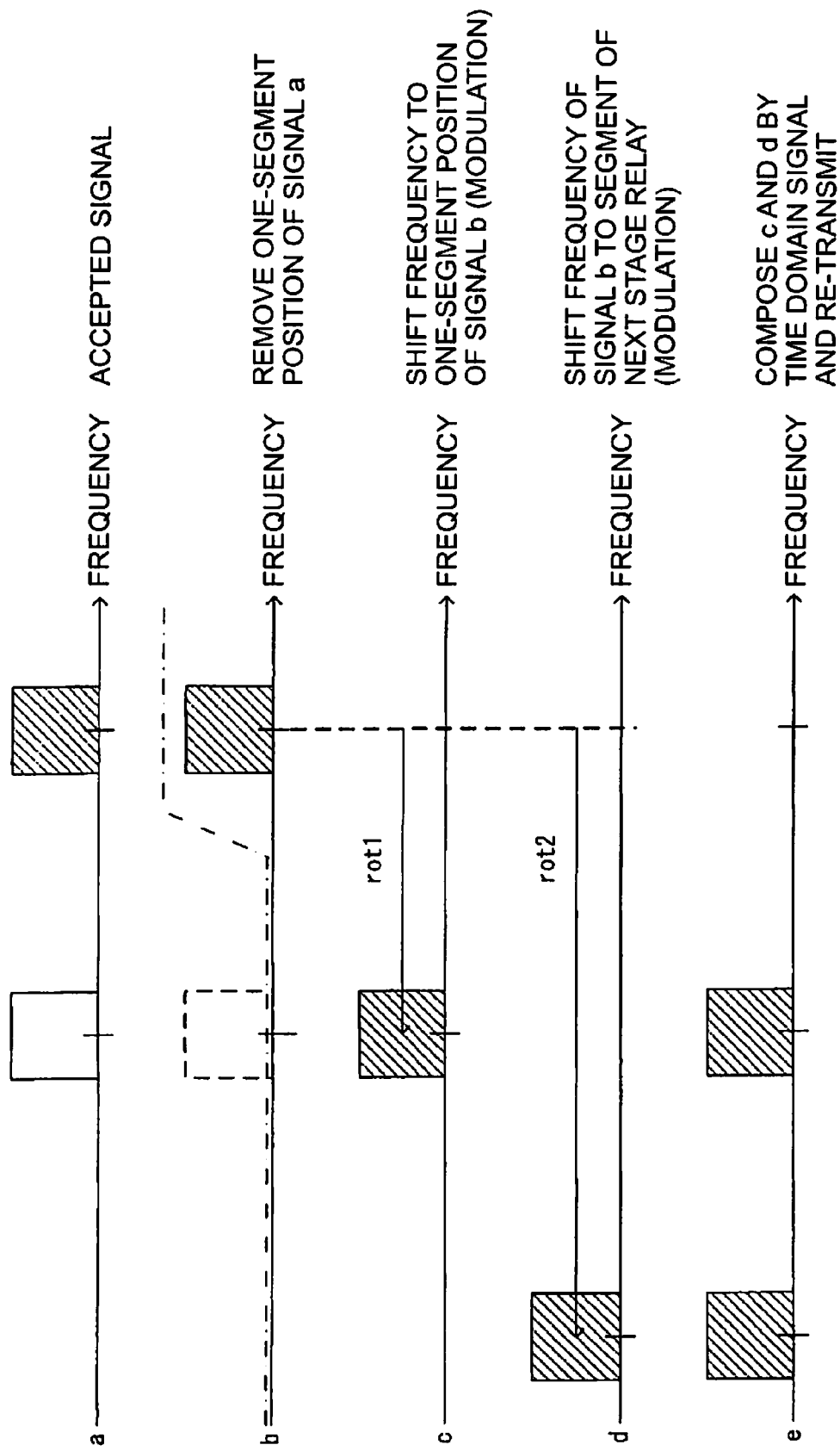
[FIG. 9] A diagram illustrating exchange processing of broadcast data according to one embodiment of the present invention.

In this example, the received signal which has the contents placed in the defined segment and the first segment (a in FIG. 9) is subject to digital conversion by an analogue/digital converter 30, and the contents placed in the defined segment of the received signal are removed by a filter 31 (b in FIG. 9).

Subsequently, the signal which is output from the filter 31 is branched, one signal is given with a frequency shift rot1 which moves the first segment to the defined segment by a multiplier 32 (c in FIG. 9), and the other signal is given with a frequency shift rot2 which moves the first segment to the second segment by a multiplier 33 (d in FIG. 9).

And, the signals which are frequency shifted (modulated) are composed by an accumulator 34 (e in FIG. 9), and the composed signal is subject to analogue conversion by a digital/analogue converter 35 as a transmission signal.

Figure 10:
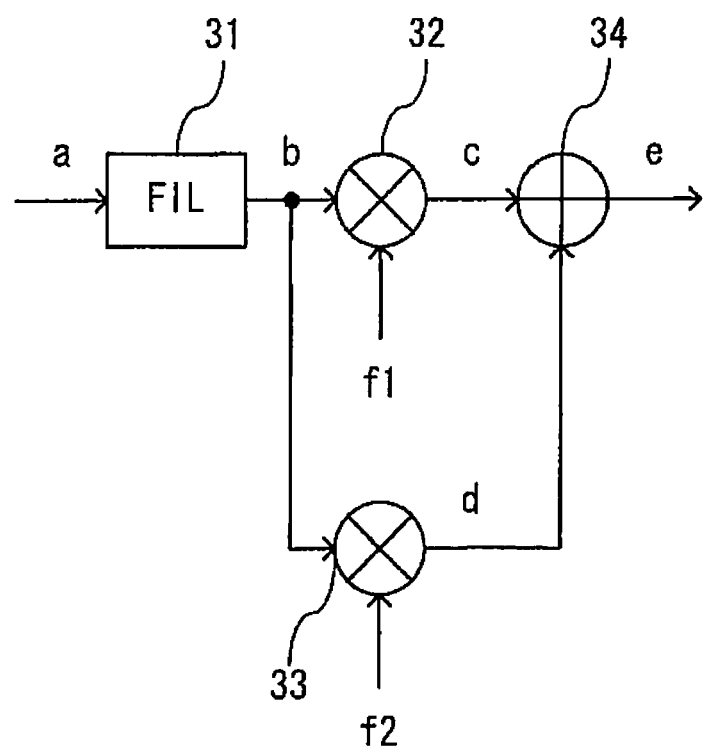
[FIG. 10] A diagram illustrating a structure for performing exchange processing of broadcast data according to one embodiment of the present invention.
Figure 11:
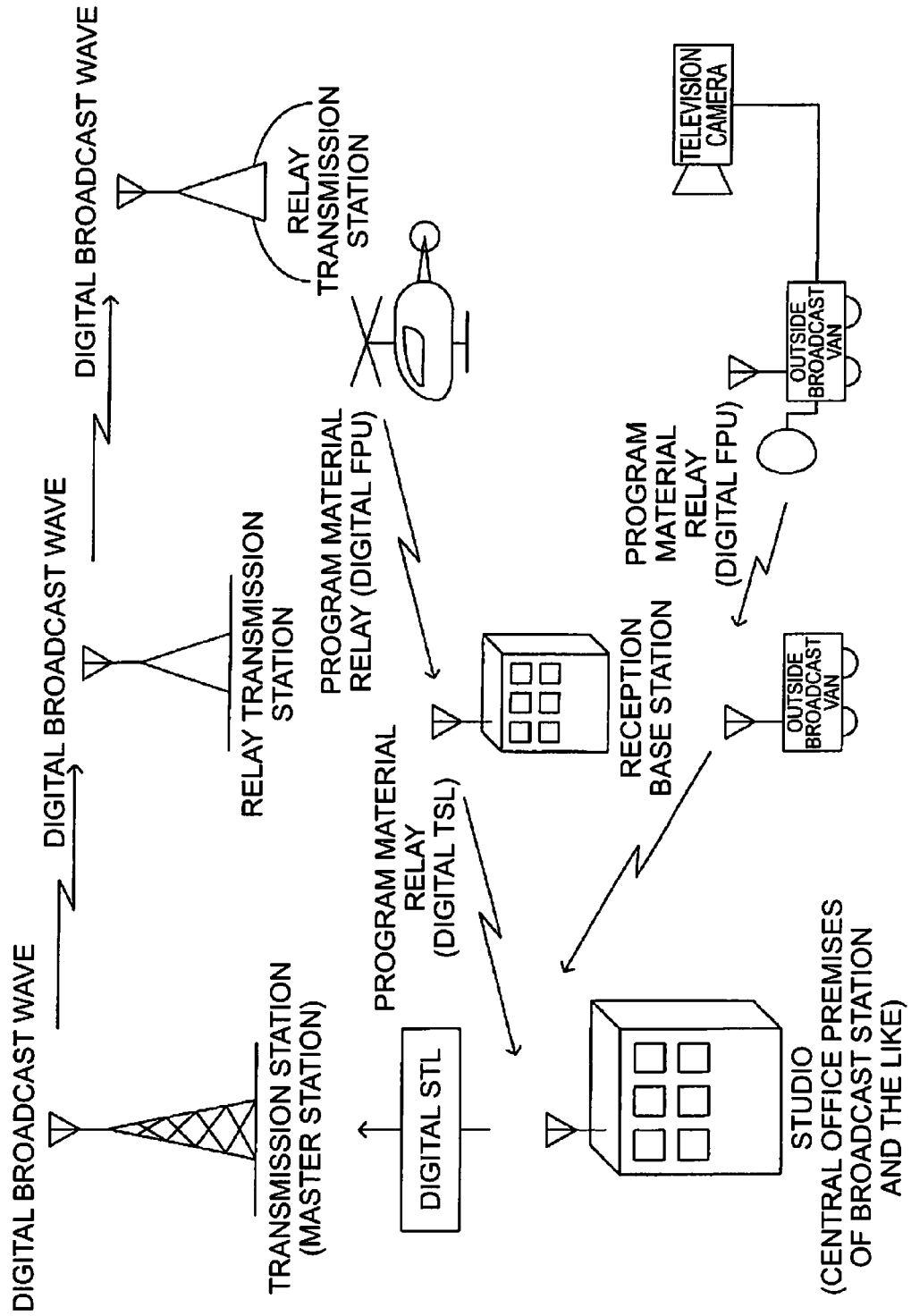
[FIG. 11] A diagram illustrating a multistage relay of digital terrestrial broadcasting.
Figure 12:
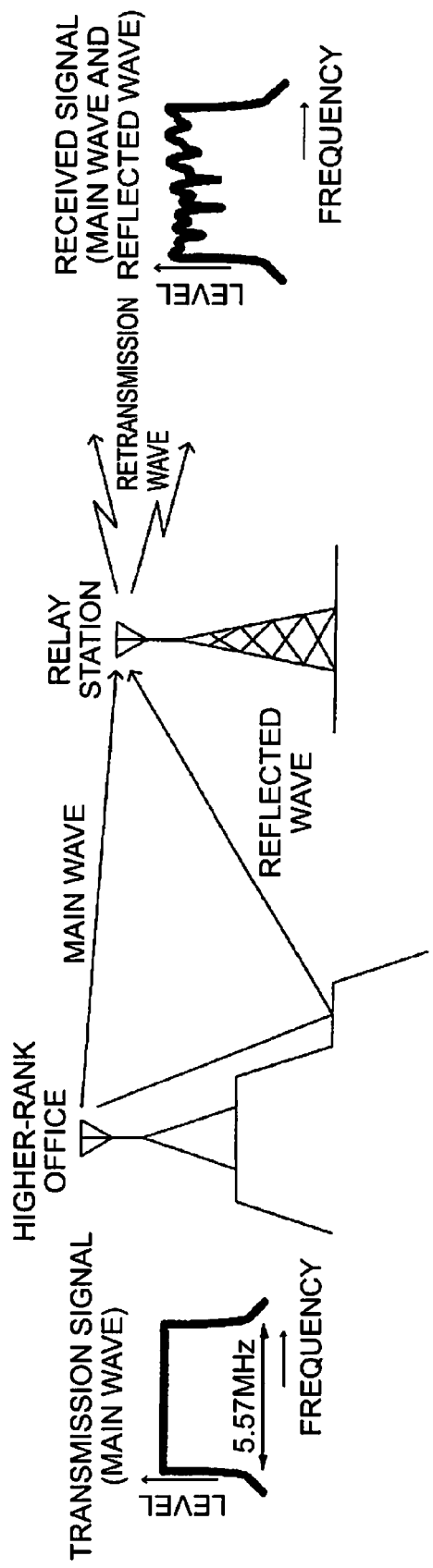
[FIG. 12] A diagram illustrating a signal degradation of digital terrestrial broadcasting.

And, when analogue signal processing only is used, the structure may be as shown in FIG. 10.

Here, the present invention can have not only a multistage relay system in which plural relay apparatuses are arranged linearly or planarly, but also has a system structure with a three-dimensional arrangement structure including the arrangement of the relay apparatus in a height direction. For example, for area broadcasting in a broadcasting range having a radius of about 300 m, it is preferable that a relay system has a three-dimensional arrangement structure because propagation of radio waves is blocked if there is a 300 m or more building or obstacle.

The present invention can also be applied to a relay of partial segment broadcasting. Therefore, for 13 segments among 14 divisions of each 6 MHz of digital terrestrial broadcasting, the invention can also be applied to not only one-segment broadcasting but also to a relay of partial segment broadcasting such as so-called digital radio broadcasting (terrestrial digital audio broadcasting) of 3 segs (3 segments) or SDTV educational television broadcasting of 4 segments.

Figure 13:
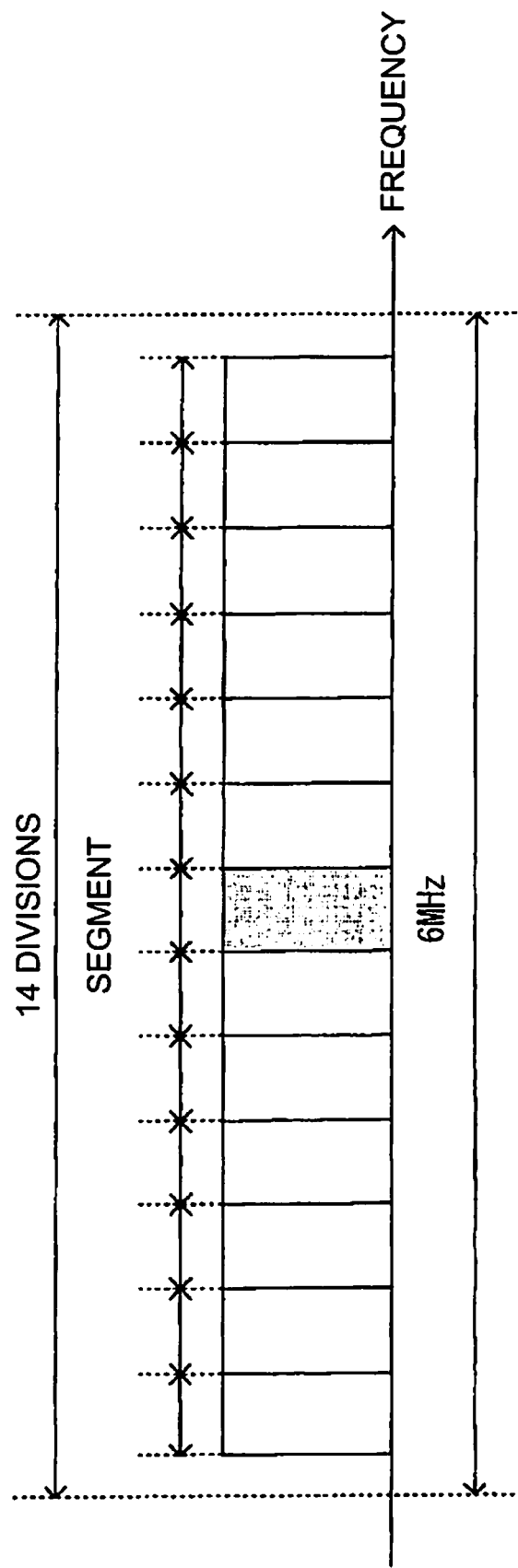
[FIG. 13] A diagram illustrating segment division of digital terrestrial broadcasting.

Specifically, in the relay apparatus that relays the broadcast waves in which broadcast data are placed in 3 or 4 segments among 13 segments in the transmission channel of broadcasting of FIG. 13, the broadcast waves received by the relay apparatus have the same broadcast data placed in each of the defined 3 or 4 segments (f0 in FIG. 1) and the first 3 or 4 segments other than the 3 or 4 segments (f1 in FIG. 1), the relay apparatus removes broadcast data for the defined 3 or 4 segments (f0 in FIG. 1) from the received broadcast waves, and transmits broadcast waves in which broadcast data for the first 3 or 4 segments (f1 in FIG. 1) of the received broadcast waves have been exchanged with each of the defined 3 or 4 segments (f0 in FIG. 1) and the second 3 or 4 segments (f2 in FIG. 1) other than the first 3 or 4 segments (f1 in FIG. 1).

And, when coding of images is renewed as MPEG-2, H.264, HEVC (High Efficiency Video Codec), efficiency doubles sequentially. That is to say, the HEVC has a coding efficiency of four times the MPEG-2 and SDTV broadcasting becomes 1 segment. Therefore, the present invention can also be applied to a partial segment relay of 1 segment of SDTV broadcasting, etc.

Industrial Applicability

According to the present invention, relay transmission with effects caused due to wraparound prevented by effectively utilizing plural frequencies (segments) in a transmission channel of broadcasting can be realized. In addition, a relay transmission system for partial segment broadcasting, which can perform multistage relay and can construct SFN without receiving wraparound effects, can be realized. And, area broadcasting by a multistage relay can be realized in high quality, and a radio wave can be used effectively.

Reference Signs List

1: Transmission apparatus, 2, 3: relay apparatus, 7: filter, 8: exchange function part, 9: transmission function part, f0: defined segment, f1: first segment, f2: second segment

The invention claimed is:

1. A relay apparatus for relaying broadcast waves in which broadcast data are placed in a defined segment among a plurality of segments, wherein:
   the broadcast waves received by the relay apparatus have the same broadcast data placed in each of the defined segment and a first segment other than the defined segment, and
   the relay apparatus removes broadcast data for the defined segment from the received broadcast waves, and transmits broadcast waves in which the broadcast data for the first segment of the received broadcast waves have been exchanged with each of the defined segment and a second segment other than the defined segment and the first segment.

2. A relay apparatus for performing multistage relay of broadcast waves in which broadcast data are placed in a defined segment among a plurality of segments, wherein:
   the broadcast waves which are received by a preceding stage relay apparatus have the same broadcast data placed in each of the defined segment and a first segment other than the defined segment,
   the preceding stage relay apparatus removes broadcast data for the defined segment from the received broadcast waves and transmits the broadcast waves in which broadcast data for the first segment of the received broadcast waves have been exchanged with each of the defined segment and a second segment other than the defined segment and the first segment, and
   a subsequent stage relay apparatus removes the broadcast data for the defined segment from the received broadcast waves, and transmits broadcast waves in which broadcast data for the second segment of the received broadcast waves have been exchanged with each of the defined segment and a third segment other than the defined segment, the first segment and the second segment.

3. A relay apparatus for relaying broadcast waves in which broadcast data have been exchanged with 3 or 4 segments among 13 segments in a broadcasting transmission channel, wherein; the broadcast waves received by the relay apparatus have the same broadcast data placed in each of the defined 3 or 4 segments and first 3 or 4 segments other than the 3 or 4 segments, the relay apparatus removes broadcast data for the defined 3 or 4 segments from the received broadcast waves, and transmits broadcast waves in which the broadcast data for the first 3 or 4 segments of the received broadcast waves have been exchanged with each of the defined 3 or 4 segments and the second 3 or 4 segments other than the first 3 or 4 segments.

4. A method for relaying broadcast waves in which broadcast data are placed in a defined segment among a plurality of segments, wherein:
   the broadcast waves relayed and received have the same broadcast data placed in each of the defined segment and a first segment other than the defined segment, and
   the broadcast data for the defined segment is removed from the received broadcast waves, and broadcast waves are transmitted in which the broadcast data for the first segment of the received broadcast waves have been exchanged with each of the defined segment and a second segment other than the defined segment and the first segment.

5. A method for performing multistage relay of broadcast waves in which broadcast data are placed in a defined segment among a plurality of segments, wherein:
   the broadcast waves which are received by a preceding relay stage have the same broadcast data placed in each of the defined segment and a first segment other than the defined segment,
   broadcast data is removed in the preceding relay stage for the defined segment from the received broadcast waves and the broadcast waves are transmitted in which broadcast data for the first segment of the received broadcast waves have been exchanged with each of the defined segment and a second segment other than the defined segment and the first segment, and
   the broadcast data is removed in subsequent relay stage for the defined segment from the received broadcast waves, and broadcast waves are transmitted in which broadcast data for the second segment of the received broadcast waves have been exchanged with each of the defined segment and a third segment other than the defined segment, the first segment and the second segment.

6. A method for relaying broadcast waves in which broadcast data have been exchanged with 3 or 4 segments among 13 segments in a broadcasting transmission channel, wherein;
   the broadcast waves relayed and received have the same broadcast data placed in each of the defined 3 or 4 segments and first 3 or 4 segments other than the 3 or 4 segments, broadcast data for the defined 3 or 4 segments is removed from the received broadcast waves, and broadcast waves are transmitted in which the broadcast data for the first 3 or 4 segments of the received broadcast waves have been exchanged with each of the defined 3 or 4 segments and the second 3 or 4 segments other than the first 3 or 4 segments.

* * * * *